United States Patent

[11] 3,551,592

[72] Inventors Larry D. Nichols
West Roxbury;
Daniel B. Kapustin, Brighton, Mass.

[21] Appl. No. 655,543
[22] Filed June 24, 1967
[45] Patented Dec. 29, 1970
[73] Assignee Moleculon Research Corporation
Cambridge, Mass.
a corporation of Massachusetts

[54] PATTERN PROCESSING SYSTEM
17 Claims, 5 Drawing Figs.

[52] U.S. Cl. ..... 178/6, 250/213
[51] Int. Cl. ..... H04n 3/10
[50] Field of Search ..... 313/108; 250/213; 315/169TV; 340/163.3; 178/366t

[56] References Cited

UNITED STATES PATENTS

| | | | |
|---|---|---|---|
| 3,210,551 | 10/1965 | Vaughn et al. | 250/213 |
| 3,217,168 | 11/1965 | Kohashi | 280/213 |
| 3,187,184 | 6/1965 | Tomlinson | 250/213 |
| 3,204,106 | 8/1965 | Murr, Jr. et al. | 250/213 |
| 3,169,192 | 2/1965 | Kohashi | 250/213 |
| 2,732,469 | 1/1956 | Palmer | 178/6 |
| 3,264,479 | 8/1966 | Peek, Jr. | 315/169T.V. |
| 3,344,280 | 9/1967 | Martel | 315/169TV |

*Primary Examiner*—Richard Murray
*Assistant Examiner*—Barry Leibowitz
*Attorney*—Chittick, Pfund, Birch, Samuels & Gauthier

ABSTRACT: An apparatus for parallel processing a two-dimensional input pattern in which the pattern is propagated in a medium at a predetermined velocity everywhere normal to the local boundary direction. In addition, all confluent boundaries of the propagating pattern are annihilated. One or more selected parameters of the pattern are extracted from the propagating pattern for subsequent processing.

INVENTOR.
LARRY D. NICHOLS
DANIEL B. KAPUSTIN
BY Russell, Chittick & Pfund

INVENTOR.
LARRY D. NICHOLS
BY DANIEL B. KAPUSTIN
Russell, Chittick & Pfund

*INVENTOR.*
LARRY D. NICHOLS
*BY* DANIEL B. KAPUSTIN
Russell, Chittick & Pfund

PATTERN PROCESSING SYSTEM

BRIEF SUMMARY OF THE INVENTION

This invention relates to pattern processing in general and, more particularly, to a pattern processing system having means for producing controlled boundary propagation of two-dimensional input patterns. The apparatus of the present invention has particular application to the field of pattern recognition and specifically therein to the parallel processing or preprocessing of handwritten or printed alphabetical and numerical characters and to the extraction of significant features from compound patterns, such as, photographs.

Most prior art approaches to pattern recognition have relied on the sequential processing of local features of an input pattern. Such approaches are limited by the fact that the features of the input pattern which are most important in imparting recognizable shape are of nonlocal nature and insensitive to a considerable degree of pattern distortion. Conventional mask-fitting techniques share the difficulties of sequential processing systems in addition to requiring accurate preadjustment of the image size and orientation. In contrast to these techniques, a method which allows the transformation transformation of an entire initial pattern into a new image or sequence of images in such a way as to reduce nonlocal features into local features of derived images, or local properties of extracted parameters, and/or which simplifies extensive two-dimensional patterns into arrays of lines and intersections, at the same time being relatively insensitive to pattern size and orientation, offers to the art a very advantageous processing or preprocessing technique for providing an input into any subsequent pattern recognition system.

A process having the desired transformational properties has been reported to the art. Harry Blum, "A Transformation for Extracting New Descriptors of Shape" et cit, presented at the Symposium on Models for the Perception of Speech and Visual Form; Boston, Massachusetts, 11—14 November, 1964. The concept presented in these papers deals primarily with the "Medial Axis Transform," (see also, for example Philbrick, "A Study of Shape Recognition Using the Medial Axis Transformation," AFCRL-66-759, Nov. 1966, Physical Science Research Papers, No. 288, Office of Aerospace Research, U.S.A.F.) which is only a portion of a more general theory which we term the "Blum Process," in which medial axes are only one of several methods for the extraction of information. The Blum Transformation or Process takes as the basis images which can be characterized by sharp boundaries, and consists, at the processing or preprocessing level, of producing boundary propagation in the image plane at a uniform velocity in a direction everywhere locally normal to the instantaneous boundary. The Blum Process is subject to one further condition, which is that confluent boundaries, i.e., where propagation originating from different parts of the parent pattern flows together, do not cross, but instead annihilate. It is this property which distinguishes the Blum Process from wave propagation in which the linear independence of wave phenomena allows the crossing of convergent wave fronts.

The propagation process can be visualized by analogy to a fire burning through a field of dry grass. If such a fire is kindled along some initial boundary, it will burn at a uniform rate inwardly and outwardly in a direction normal to the original boundary. Where two flame fronts meet, the fire will go out, thus obeying the stated rules of propagation and annihilation of the Blum Process. The annihilation loci can be visualized at the points where the fire burns out. If the original fire were kindled in the shape of a man, the annihilation loci would be a stick figure.

This analogy exemplifies one of two essentially similar types of propagation, namely that termed "line-propagation," in which the propagating boundaries are directly displayed. The alternative process, termed "area-propagation," exhibits propagating boundaries only as the borders between displayed areas and a passive background. This could be visualized by a grass fire burning in a field which supports combustion at each point for a period of time longer than that required for propagation over the whole field. The term propagation, when used without qualifiers, will be taken to denote both types. Equivalent information can be extracted from either type of pattern propagation.

It is a general object of the present invention to provide a pattern processing system which utilizes the Blum Process of pattern transformation.

It is a specific object of the invention to provide a physical means for implementing the propagation and annihilation characteristics of the Blum Process of pattern transformation.

The present invention utilizes in the pattern propagation portion of the system, a novel application of the phenomenon of image growth of or "flooding" on panels constructed of both electroluminescent and photoconductive materials positioned between transparent conductive electrodes. Heretofore, this phenomenon has been solely a source of difficulty to producers of image display and intensification screens, and considerable efforts have been directed in the past toward the suppression rather than toward utilization or control of the flooding phenomenon, e.g., U.S. Pat. No. 3,204,106, issued Aug. 31, 1965 for Storage-Type Electroluminescent Image Amplifier. In the present invention, the pattern propagating component of the processing system produces controlled pattern propagation in accordance with the propagation and annihilation rules of the Blum Process by means of controlled optical feedback between the electroluminescent and photoconductive materials.

The objects and features of the present invention will best be understood from the more detailed description of certain embodiments thereof, selected for purposes of illustration, and shown in the accompanying drawings in which.

Figure 1:
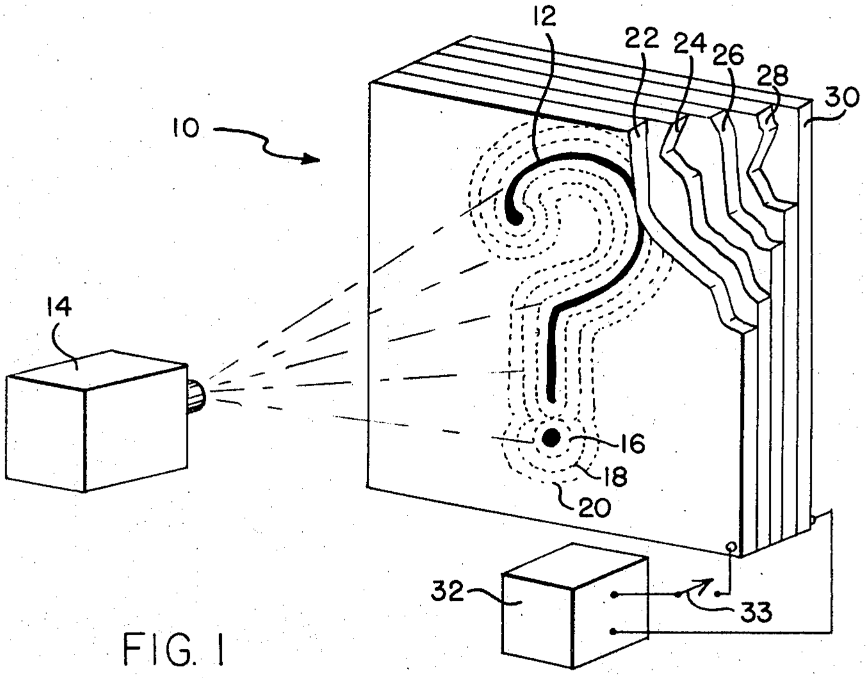
FIG. 1 is a view in perspective, with parts broken away, of a laminar embodiment of an image propagation screen.

Turning now to the drawings and particularly to FIG. 1 thereof, there is shown in perspective, with parts broken away, a laminar embodiment of an image propagation screen indicated generally by the reference numeral 10. The purpose of the image propagation screen 10 is to transform an optical input image 12 provided by some external optical system 14, into a smooth and continuous sequence of transformed images, such as, those shown at various later times as 16, 18 and 20. It can be seen from an examination of the propagating image 12, as shown in FIG. 1, that the propagation occurs in a direction everywhere locally normal to the instantaneous boundary. This propagation characteristic fulfills one requirement of the Blum Process. The second characteristic of the Blum Process, i.e., that confluent boundaries of the propagating pattern are annihilated, is also satisfied. For area propagation, boundaries automatically disappear as illuminated areas coalesce. For line propagation, confluent boundaries each encounter the regions of relaxing and not immediately reexcitable phosphor and photoconductor trailing the other, and are thus mutually extinguished.

The laminar image propagation screen 10 comprises a transparent and conductive electrode 22 which is positioned adjacent to a photoconductive layer 24 that in turn is sequentially followed by a semitransparent layer 26, an electroluminescent layer 28 and finally a second transparent, conductive electrode 30. The materials for constructing the photoconductive and electroluminescent layers 24 and 28, respectively, are readily available and well known to those in the art. However, for descriptive purposes a representative example will be given for each layer. Thus, the photoconductive layer 24 may comprise a photoconductive semiconductor, such as, a cadmium sulfide, sintered or imbedded in glass, ceramic or transparent plastic. Similarly, the electroluminescent layer 28 may comprise an electroluminescent phosphor, such as, zinc sulfide, sintered or imbedded in glass, ceramic or transparent plastic. Of course, other other materials displaying the necessary electroluminescent and photoconductive characteristics can be employed in son constructing the image propagation screen 10.

The transparent conductive coatings for electrodes 22 and 28 are well known in the art and need not be described in detail. The familiar "TIC" glass constitutes such a coating. The intermediate transparent or semitransparent layer 26 can comprise any material not completely opaque, such as, a glass, ceramic or plastic, which by its thickness and optical transparency serve to determine in part the resolution saturated luminance, and propagation velocity of the screen 10.

The presence of the electroluminescent phosphor between the electrodes 22 and 28 constitutes an electroluminescent area cell. As A suitable source of electromotive force 32 is connected across the conductive electrodes 22 and 28 through a switch 33. If the source 32 provides alternating current AC the screen 10 will most readily display area type propagation. However, if direct current DC is supplied by the source, then either area or line propagation can be achieved depending upon the relaxation times of the components.

For purposes of illustration, the current source 32 will be assumed, hereinafter, to supply an alternating current to the pattern propagation screen 10. This current source can be of any frequency, from a few hertz to a few megahertz, for example, and can have an amplitude in the general range of 50 to 2000 volts.

Having briefly described the structure of the laminar embodiment of the image propagation screen 10, we will now discuss the method of producing image propagation on the screen. The initial imposition of the light pattern or image 12, IR, visible or UV, through the transparent electrode 22 onto the photoconductor form layer 24 converts the illuminated portions of the photoconductor from an insulator to a moderately conductive material. Thus, in the dark regions, the applied AC voltage drops across both the photoconductor and electroluminescent phosphor layers 24 and 28, respectively, as across two series capacitors, while in the illuminated regions, the full voltage drop occurs across the phosphor. Provided the distributed capacitance of the photoconductor 24 is small compared to that of the electroluminescent material, as would be the case, for example, if the photoconductive layer 24 is much thicker than the electroluminescent layer 28, very little voltage will appear across the electroluminescent layer in the dark regions and little or no light will be generated by the electroluminescent layer. On the other hand, in the illuminated regions, the larger voltage signal will give rise to the generation of light by the phosphor. If desired, the slight background level of light generated in the unilluminated regions can be further suppressed by the addition of a ferroelectric (nonlinear resistance) layer.

Figure 2:
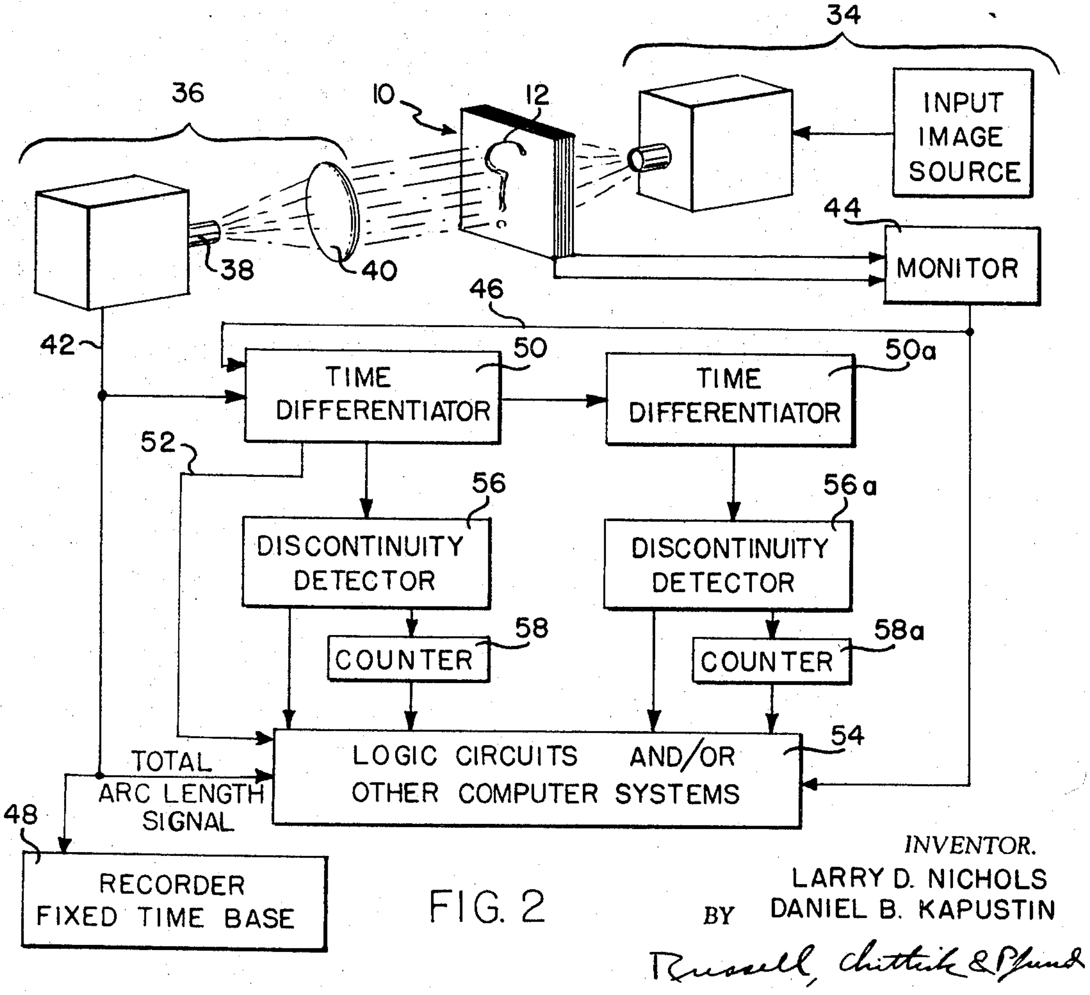
FIG. 2 is a diagrammatic view in partial perspective and block diagram form showing the pattern propagating screen of FIG. 1 incorporated in one embodiment of the pattern processing system which extracts the total arc length parameter from the propagating pattern.

At this point, it may be assumed that the input image 12 is extinguished. The identical output image which is formed on the phosphor layer 28 and which can be seen through the conductive transparent electrode 30 (as illustrated in FIG. 2), does not in turn disappear since the light falling from the phosphor layer through the semitransparent layer 26 onto the photoconductor maintains the photoconductor in a conductive state and sustains the full voltage across the phosphor. If this optical feedback were fully collimated along the axis normal to the screen, or if the semitransparent layer 26 were of infinitesimal thickness, the process would end at this point and the image propagation screen 10 would function only to retain the form of the original input image 12 until the input voltage to the transparent electrodes were interrupted by opening switch 33. In practice, the complete absence of lateral light diffusion is difficult to achieve. The light from the electroluminescent layer 28 is fed back through the intermediate layer 26 to the photoconductor layer 24 with some lateral spreading. This in turn changes the resistivity of the photoconductor layer 24 which then causes a larger area in the electroluminescent layer 28 to become excited. Thus, the outline of the input image 12 gradually becomes more diffuse on any screen capable of presenting an appreciable gray scale. This is the problem of "flooding" referred to previously in connection with the prior art image storage or intensification screens.

In the pattern processing system of the present invention, an image propagation screen having a high contrast characteristic is used to achieve the desired normal boundary propagation. As used herein, the term "high contrast characteristic" refers to an image propagation screen on which the level of light output from the phosphor increases rapidly and without further external illumination once the corresponding photoconductive region has been exposed to some low threshold level of input light. This process continues until the saturated level of phosphor light output is achieved that is characteristic of the particular screen. The necessary threshold level and the rate of approach to saturation combine with the rate of lateral attenuation provided by the semitransparent layer 26 to determine the resolution and rate of propagation of the screen 10. The rate of lateral attenuation depends in turn on both geometrical factors, such as, inverse square attenuation, scattering, and internal reflection, and on the characteristic bulk absorption properties of the semitransparent layer 26 toward light having the spectral distribution characteristic of the phosphor and the applied voltage signal.

The resultant resolution and rate of propagation are also dependent upon the sensitivity of the photoconductor toward light with the spectral distribution emerging from the semitransparent layer 26, and on the characteristic response times of both the photoconductor and the electroluminescent phosphor, which are themselves dependent not only on composition, but also upon the amplitude and frequency of the applied voltage. It will be appreciated that while the material properties and layer thicknesses are constant for any single screen, it is still possible to achieve control over both velocity and resolution of the screen by controlling the power supply characteristics.

The various material and dimensional parameters influencing the performance of the image propagation screen 10 at any given power supply settings can be reduced to four: (1) the rate of flux increase immediately after initiation of any small region on the screen; (2) the thickness of the semitransparent layer 26; (3) the absorptivity of the semitransparent layer; and, (4) the minimum flux level on the internal photoconductor surface sufficient to initiate the approach to saturation.

The general dependence upon these parameters can be expressed in the following manner: The velocity of propagation is proportional to the rate of initial flux increase and inversely proportional to the required initiation flux, while the linear resolution of the screen, i.e., the apparent width of the propagating boundary region, is proportional to the final saturated flux, inversely proportional to the required minimum initiation flux, and is approximately insensitive to the rate of flux increase. The dependence upon the thickness and absorptivity of the semitransparent layer 26 is somewhat more complex; the behavior in limiting cases is illustrative. If the absorptivity approaches zero for a finite thickness, that is, if the central layer 26 is completely transparent, both the boundary width and the propagation velocity become very large and the entire screen begins to light up as soon as some one region is initiated externally, so that in practice the screen is unstable. If, on the other hand, the thickness goes to zero for some finite absorptivity, the boundaries become very sharp and the velocity of propagation becomes very slow, so that the screen approaches a purely retentive operation. Intermediate values of thickness and absorptivity are required for practical image propagation screens. The angular resolution of the screen, which is to say the extend to which sharp corners become rounded during propagation, is essentially proportional to the semitransparent layer thickness and of the same order of magnitude.

It will be appreciated that physically, the electroluminescent-photoconductive (EL–PC) image propagation screen 10, when powered by DC will have boundary or area propagation depending upon how long an excited point remains excited If the relaxation time of the electroluminescent phosphor is just equal to the time it takes a boundary to propagate from one granule to another, then the propagation will represent only a boundary. However, as the relaxation time increases, an area will be defined. In the extreme case, if the relaxation time is equal to or greater than the time necessary for a boundary to propagate across the screen or if the screen is bistable and excited points remain lit indefinitely, an area of uniform brightness will be defined and the screen will provide complete area propagation. Relaxation times in between these two extremes will result in a number of intermediate cases represented by partial areas of nonuniform brightness. The nonuniformity will represent a time history of excitation or propagation of the original input image 12.

Having described in detail a laminar embodiment of an EL–PC image propagation screen utilizing controlled optical feedback for performing a Blum Transformation, we will now discuss the use of such as screen in the pattern processing system of the present invention. Referring to FIG. 2, there is shown in partial perspective and block diagram form a pattern processing system utilizing an EL–PC screen for obtaining a Blum Transformation of an input image. The pattern processing system can be broken down into three major components: first, an input device, indicated by brackets and the reference numeral 34, for projecting the pattern to be analyzed onto the photoconductive layer of the pattern propagating screen; second, the EL–PC screen 10 and its accessories, such as, the power supply (not shown); and, third, means for extracting a predetermined parameter from the propagating pattern. The pattern parameter extracting means, indicated by brackets and the reference numeral 36, comprises one or more monitors which survey the EL–PC screen 10. The monitors can be classified in two groups, electrical and optical. The electrical monitors detect changes in the electrical characteristics of the EL–PC screen relating to the Blum Process, such as, for example, the instantaneous capacitance of the panel which is a function of the total illuminated area which, itself, is a function of the total arc length of the propagating pattern. The optical monitor monitors optical characteristics of the screen, such as, the total illuminated screen area.

Propagation of the input image 12 on the EL–PC screen represents a mathematical transformation which allows both global and local monitoring. The output from each monitor, in turn, represents an image parameter whose interpretation is related to the general theory. Thus, the output of each monitor may be further connected to suitable logic and/or display equipment in order to extract its informational content. However, before discussing in detail the instrumentation of the various embodiments of the pattern processing system of the present invention, it will be helpful to briefly set forth in outline form some of the basic parameters that can be extracted from the propagating pattern on screen 10.

The basic parameters of the propagating image are as follows:

A. Total Arc Length

The total arc length function yeilds, with the appropriate mathematical manipulation, the following information about the propagating pattern:

1. zeroth time derivative — geometrical properties, such as, constant curvature and order or symmetry (sudden decreases due to annihilation of confluent boundaries).
2. higher time derivatives—topological properties, such as, Euler's number, i.e., the number of discrete figures minus the number of loops.

B. The Original Image or Pattern 1. spatial derivatives—spatial differentiation of the original arc with respect to some coordinate system will yield curvature properties and general symmetries.

C. The Annihilation Locus

The phenomenon of annihilation of confluent boundaries yields the following information about the subject figure:

1. zeroth time derivative—symmetry as indicated by the annihilation locus itself.
2. higher time derivatives — order and periodicity (bursts of annihilation points).
3. partial derivatives (spatial and temporal) — this measures the rate of evolution of annihilation points (velocity) and reveals information regarding the curvature of the annihilating fronts.
4. spatial derivatives — curvature properties and topological properties, such as, convexity and connectedness.

D. The Propagation Cycle

Consecutive positive and negative (or vice versa) propagation of a figure on the screen will yield the following information about the subject figure:

1. spatial distribution properties such as density.
2. geometrical properties such as physical extent, e.g., long and thin, short and fat.
3. pattern segmentation — the propagation cycle can effectively segment the pattern thereby more clearly defining its major components.

The pattern or image parameters listed above can be extracted from the propagating pattern by means of embodiments of the present invention depicted in FIGS. 2, 3, 4 and 5, respectively. In each of these figures, the pattern processing system has been depicted diagrammatically, in partial perspective and block diagram form, in order to illustrate the major components and functions of the present invention. The specific electronic circuitry has not been shown beyond the level of a block diagram because the actual implementation of the circuitry illustrated in block form is well within the capability of the art at the present time utilizing known circuits and available components.

Turning now to FIGS. 2 through 5, we will describe in detail the various embodiments of the pattern processing system that are employed to extract any one of the following image or pattern parameters: (A) Total Arc Length; (B) The Original Image or Pattern; (C) The Annihilation Locus; and, (D) The Propagation Cycle. FIG. 2 illustrates a pattern processing system for extracting the total arc length parameter from the propagating pattern on the EL–PC screen 10. Since the total screen brightness is a function of the total arc length of the propagating pattern, extraction of that pattern parameter can be obtained by means of photomultiplier 38 and its associated optical system, depicted diagrammatically as a single lens 40. The photomultiplier 38 produces an electrical output signal on lead 42 having a characteristic which varies in accordance with the total brightness of the screen. Thus, the output signal represents the total arc length of the propagating pattern for a screen having line type propagation. For an area type screen, the same information is obtained from the first derivative of the output signal.

It will be appreciated that other electrical properties of the EL–PC screen 10 such as capacitance, inductance or resistance, can be used to monitor the total arc length parameter of the propagating pattern. Any change in these electrical properties produced by the transformation of the image on the screen is detected by a monitoring circuit 44 that produces an electrical output signal on lead 46 having a characteristic which varies in accordance with the total arc length of the propagating pattern.

It has already been mentioned that the total arc length function yeilds, with the appropriate mathematical manipulation, the zeroth and higher time derivatives. Since the zeroth time derivative is merely a plot of arc length with respect to time, the total arc length signal on photomultiplier output lead 42 is fed directly to a recorder 48 having a fixed time base. If the screen has area type propagation the level of all these derivatives is raised by one to obtain the same information.

The higher time derivatives are obtained by differentiating the total arc length signal in one or more time differentiators 50, 50*a*, etc. The output signal on lead 52 from time differentiator 50 represents the first derivative of the total arc length signal in analogue form. The analogue derivative signal is fed to appropriate logic circuits and/or other computer systems 54 for subsequent processing.

An output from the time differentiator 50 is also fed to a discontinuity detector 56 which comprises a second differentiator (not shown) that stores consecutive signals and compares them for a change in sign. Whenever a change in sign occurs, an output signal is generated by the discontinuity detector 56 and fed to a counter 58 which stores the cumulative sum of the number of discontinuities. Output signals from the discontinuity detector 56 and counter 58 are available for logical manipulation and further signal processing by the circuits identified by the reference numeral 54. Discontinuity detection and counting can also be performed with respect to a second derivative signal obtained from time differentiator 50*a* by means of the corresponding discontinuity detector and counter 56*a* and 58*a*, respectively.

Figure 3:
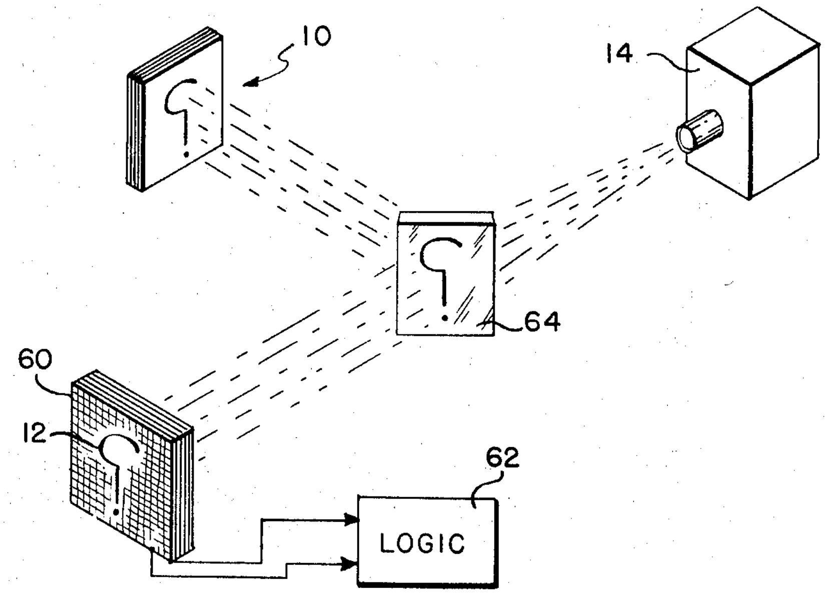
FIG. 3 is a diagrammatic view of another embodiment of the pattern processing system illustrating the temporal an spatial differentiation of the original propagating pattern.

The second parameter listed above is the Original Image or Pattern which includes the pattern at both time zero and afterwards when it has begun to propagate on the EL–PC screen 10 in accordance with the Blum Transformation FIG. 3 illustrates the embodiment of the pattern processing system which provides both spatial and time differentiation of the original image or pattern. In order to achieve spatial differentiation of the input image 12, signals must be generated at various spatial points on the EL–PC screen surface which are simultaneously stores and compared. In addition, it is also necessary to know the exact distance between any two points on the screen. In FIG. 3, spatial differentiation of the input image 12 is accomplished by propagation on a gridded EL–PC screen 60. The screen grid is directly connected to a suitable logic circuit illustrated in block diagram form and identified by the reference numeral 62. For purposes of clarity, only two segments of the screen grid have been shown connected to the logic circuit 62. However, it will be understood that each segment of the grid is connected to the logic circuit.

The propagation of the image 12 on a gridded screen, such as the gridded EL–PC screen 60 illustrated in FIG. 3, produces a loss of resolution. Therefore, it is desirable to have simultaneous propagation of the same pattern on both a gridded and a nongridded screen so that measurements not utilizing the grid may be optimized. FIG. 3 illustrates one possible configuration for achieving the desired simultaneous propagation of the input pattern on both a gridded and nongridded screen. Looking at FIG. 3, the input image is projected by the optical system 14 through a half-silvered mirror 64 which splits the image beam and allows the input pattern to be projected upon both the gridded EL–PC screen 60 and a nongridded EL–PC screen, such as the screen 10 illustrated in FIG. 1. For purposes of clarity, the parameter extracting and time differentiating circuitry for screen 10 has not been duplicated in FIG. 3. However, it should be understood that the total arc length parameter is extracted from the image on screen 10, differentiated and fed to the logic circuit 62.

Figure 4:
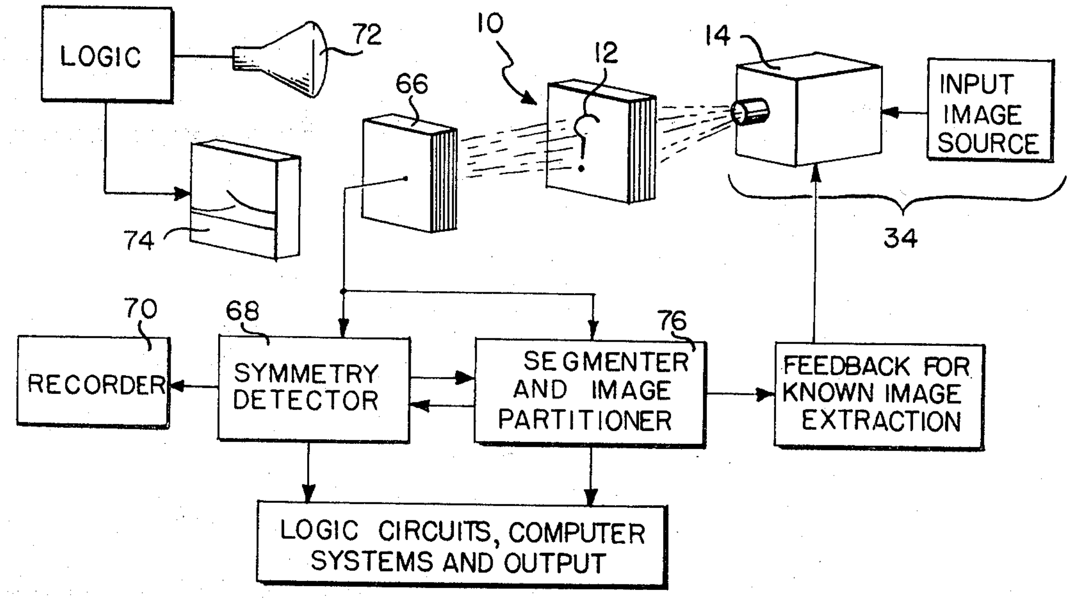
FIG. 4 is a diagrammatic view of still another embodiment of the invention showing the extraction of the annihilation locus parameter from the propagating pattern.

The third parameter, i.e., the annihilation locus of the propagating pattern, can be extracted from the pattern by means of the system embodiment depicted in FIG. 4. The annihilation locus, or medial axis, is itself an indication of symmetry in the original pattern. If a plot of the total annihilation locus length is made with respect to time, such a plot can reveal information regarding the order, or lack of order, in the original pattern. A trivial, but illustrative example, is a lattice of perfectly spaced points, which will annihilate each other in one grand burst, as opposed to a random distribution of points which will annihilate each other randomly through time.

Looking at FIG. 4, the annihilation locus of the propagating image 12 is obtained by using a second EL–PC laminate or screen 66 having an excitation threshold higher than the first EL–PC screen 10. Assuming that two propagating fronts in the original pattern meet, they will produce an image on the screen 10 that is brighter than either of the original fronts. In view of the higher threshold sensitivity of the second screen, the screen will not respond to a signal strength equal to that of the original front, but instead will respond to one equal to the stronger combined image. The second EL–PC screen 66 need not itself propagate, unless it is desired to perform an iterative Blum propagation.

Monitoring of the annihilation locus on the second EL–PC screen 66 is performed by any one of previously described monitors. For purposes of clarity, the monitors are collectively represented in block form as a symmetry detector 68. The output signal from the symmetry detector 68 is then fed to a recorder 70 which plots signal strength against a time base.

Annihilation can also be detected electronically rather than by means of a separate EL–PC screen. For example, a flying spot scanner 72 can be directly coupled to the single EL–PC screen 10 to register an annihilation point whenever two points are detected to be traveling towards each other and are calculated to collide. If annihilation is detected electronically, it may be desirable in certain instances to provide a visual display of the annihilation locus on a separate EL–PC screen 74. The pattern shown on the annihilation display screen 74 represents the annihilation locus of the "" input image 12.

Alternatively, the annihilation locus can be directly generated by the superposition of a small cyclic propagation component onto a steady propagation process, coupled with a differencing circuit. In this technique, any corner would first propagate inward, retaining its sharp character, and then outward, being consequently slightly rounded. The difference between the start and finish of this process is just a small region lying on the annihilation locus for the corner. Steady continuation of this process would produce a trace of the entire annihilation locus without further instrumentation.

It will be appreciated at this point that the system uses the time history of evolution of the annihilation locus, which is itself a static measure of symmetry, to measure the order in the original pattern. A further application of the annihilation locus parameter is based on the following properties: if a circle is propagated until internal annihilation occurs, the time lapse from initiation to annihilation noted, the annihilation point itself propagated on the EL–PC screen and the original circle propagated on the screen after a time lapse equal to the original time lapse, self-annihilation of the circle will occur. If this process is performed selectively on certain portions of a complex figure, the result would be the original figure minus some of its parts. Furthermore, it is not necessary to know the nature of a part in order to eliminate that particular part. Thus, by relatively few trial and error processes, such as these, it is possible to test a complex figure to determine if one of its component figures is of particular interest.

In FIG. 4, this process is represented by a segmenter and image partitioner 76 which takes a certain selected portion of the annihilation locus and feeds it back to the input to achieve self-annihilation. The partition of the propagating pattern can be achieved by utilizing a gridded EL–PC screen (not shown) and the segmenting process or selection of predetermined portions of the partitioned image can be performed by appropriate logic circuits (not shown). The self-annihilation process can be done independently or sequentially with symmetry detection and it is also possible to separately analyze individual portions of the medial axis by placing the segmenter before the symmetry detector 68.

Figure 5:
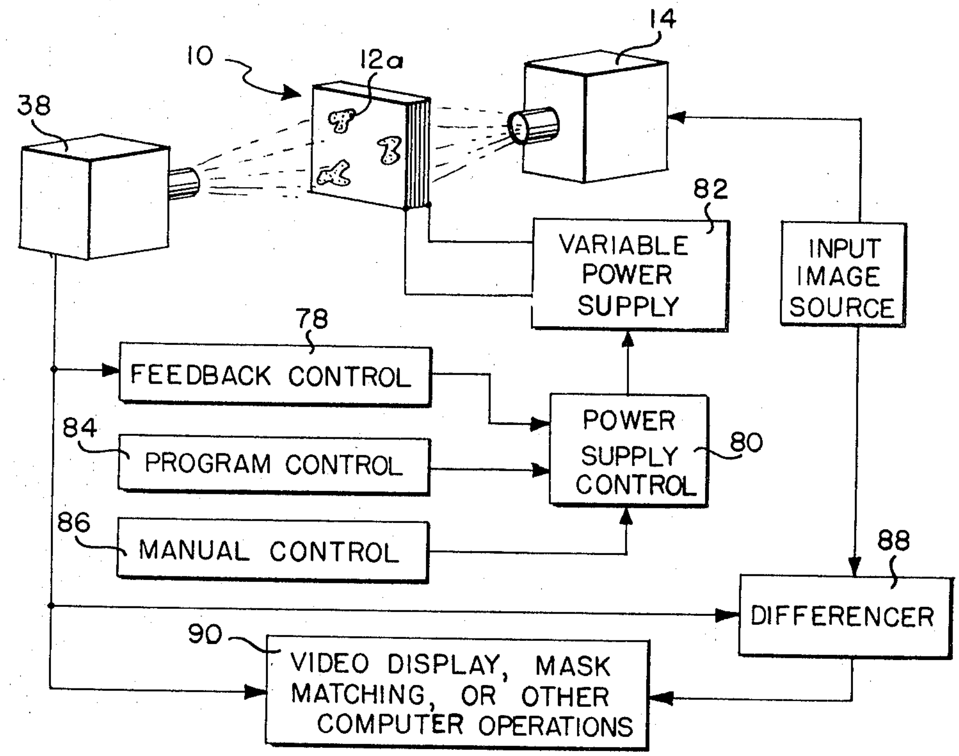
FIG. 5 is a diagrammatic view of a further embodiment of the invention for performing alternating positive and negative or negative and positive propagation of the input pattern on the laminar screen illustrated in FIG. 1.

Turning now to FIG. 5, there is shown an embodiment of the pattern processing system of the present invention which provides for propagation cycling of the input image 12*a*. The usefulness of performing alternating positive and negative (or vice versa) propagation of the input image is based on the fact that a Blum cycle does not conserve information. Dense portions of the image will coalesce and disappear in the positive-negative cycle and long, thin objects will do likewise in the negative-positive cycle. Positive propagation has already been described in connection with the laminar screen depicted in FIG. 1. Negative propagation of the image occurs when the power supply voltage drops below the level necessary to maintain optical feedback between the electroluminescent layer 28 and the photoconductive layer 24.

In the system depicted in FIG. 5, a feedback control 78 supplies a control signal to a power supply control 80 whenever the image or pattern coalesces. The power supply control 80 in turn varies either or both the frequency and amplitude of the power supplied to screen 10 by a variable power supply 82. If desired, the cycling operation can be performed after a fixed time independent of the nature of the pattern by means of a program control 84 or at any desired time by means of a manual control 86.

The cycled figure is compared with the original input image in a differencer 88 which supplies a suitable output signal to signal processing circuitry 90 for video display, mask matching or other computer operations. One method of implementing the differencer 88 is by using a gridded photocell (not shown) which will register a reading at each point based on the darkening at that point caused by the original figure. If the cycled figure is then superimposed on this, each point not registering precisely double the original darkening would represent a point that has been altered by the cycling operation.

Having described in detail various embodiments of the pattern processing system of the present invention, it will now be apparent to those skilled in the art that various alterations and modifications of the system can be made without departing from the scope of the invention. Specifically, for example, the geometry of the image propagating medium can be changed from the laminar embodiment depicted in FIG. 1. Therefore, it should be understood that the control and utilization of boundary propagation by means of optical feedback between electroluminescent and photoconductive materials is not limited to laminar structures, but can also be achieved by using an intimate mixture of electroluminescent and photoconductive materials or by other geometries. In addition, other techniques can be employed for extracting any one of the selected parameters from the propagating pattern.

We claim:

1. A pattern processing system comprising:
a. means responsive to a two-dimensional electromagnetic radiation input pattern for propagating said pattern in a direction normal to the local boundary, said means providing for the annihilation of confluent boundaries;
b. means for illuminating said electromagnetic radiation responsive means with a two-dimensional electromagnetic radiation pattern; and
c. means for extracting a preselected parameter from said propagating pattern.

2. The pattern processing system of claim 1 further characterized by said pattern propagation having a uniform velocity at any selected time.

3. The pattern processing system of claim 1 further characterized by means for controlling the propagation velocity of said propagating pattern.

4. The pattern processing system of claim 1 further characterized by means for reversing the direction of the pattern propagation.

5. The pattern processing system of claim 1 wherein said parameter is the total arc length of said propagating pattern.

6. The pattern processing system of claim 1 wherein said parameter is the locus of annihilation of said confluent boundaries.

7. A pattern processing system comprising:
a. electromagnetic radiation responsive means having an electrical resistivity which varies inversely with the flux density of said electromagnetic radiation;
b. means responsive to an applied electromotive force for producing electromagnetic radiation having a flux density which varies directly with said applied electromotive force;
c. means for coupling said radiation producing means and said radiation responsive means for producing controlled feedback therebetween;
d. means for applying an electrical potential across said radiation responsive and radiation producing means;
e. means for illuminating said radiation responsive means with a two-dimensional electromagnetic radiation pattern; and
f. means for extracting a preselected parameter from the propagating pattern produced by illuminating said radiation responsive means.

8. The pattern processing system of claim 7 wherein said radiation responsive means comprises a photoconductive material, said radiation producing means comprises an electroluminescent material and said coupling means comprises a material which is semitransparent to said electromagnetic radiation.

9. The pattern processing system of claim 7 wherein said pattern parameter extracting means produces an electrical signal having a characteristic which varies in accordance with the flux density of the radiation emitted by said radiation producing means.

10. A pattern processing system comprising:
a. means responsive to the input of a two-dimensional light pattern for propagating said pattern in a direction normal to the local boundary, said means providing for the annihilation of confluent boundaries;
b. means for illuminating said light responsive means with a two-dimensional light pattern; and
c. means for extracting a preselected parameter from said propagating pattern.

11. The pattern processing system of claim 10 wherein said pattern propagating means comprises: a laminar screen structure having a first transparent electrode, a photoconductive layer, an electroluminescent layer, a second transparent electrode and means for electrically coupling said photoconductive layer to said electroluminescent layer and optically coupling said electroluminescent layer to said photoconductive layer, said coupling means being positioned between said layers; and power supply means for impressing an electromotive force across said electrodes.

12. The pattern processing system of claim 11 wherein said coupling means comprises a semitransparent intermediate layer having a preselected thickness.

13. The pattern processing system of claim 11 further characterized by said power supply means including means for varying at least one electrical characteristic of the electromotive force impressed across said electrodes.

14. The pattern processing system of claim 11 wherein said pattern parameter extracting means produces an electrical signal having a characteristic which varies in accordance with said preselected parameter.

15. The pattern processing system of claim 11 wherein said pattern parameter extracting means produces an electrical signal having a characteristic which varies in accordance with a predetermined electrical parameter of said laminar screen structure.

16. The pattern processing system of claim 15 wherein said electrical parameter is the total capacitance of said screen.

17. The pattern processing system of claim 10 wherein said pattern propagating means comprises: a laminar screen structure having a first transparent electrode, a photoconductive layer, an electroluminescent layer comprising an electroluminescent material dispersed in a transparent binder material, and a second transparent electrode; and power supply means for impressing an electromotive force across said electrodes.